United States Patent
Kain et al.

(10) Patent No.: US 6,752,462 B1
(45) Date of Patent: Jun. 22, 2004

(54) JUVENILE SEAT WITH PIVOTABLE ARMREST

(75) Inventors: James M. Kain, Troy, OH (US); Eugene Balensiefer, Seymour, IN (US); William Horton, Hope, IN (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 10/407,392

(22) Filed: Apr. 4, 2003

(51) Int. Cl.[7] .............................................. A47C 7/54
(52) U.S. Cl. ........................ 297/411.38; 297/250.1; 297/411.32
(58) Field of Search .................. 297/250.1, 411.32, 297/411.38, 373, 354.12, 408; 403/97, 103

(56) References Cited

U.S. PATENT DOCUMENTS

| | | | | |
|---|---|---|---|---|
| 3,397,912 A | * | 8/1968 | Bush | 297/354.12 |
| 5,316,373 A | * | 5/1994 | Markel | 297/411.32 |
| 5,524,970 A | * | 6/1996 | Kienke et al. | 297/362 |
| 6,257,668 B1 | * | 7/2001 | Chou et al. | 297/411.32 |
| 6,382,726 B2 | * | 5/2002 | Bullesbach et al. | 297/411.38 |
| 6,527,338 B2 | * | 3/2003 | Greene | 297/115 |
| 6,578,922 B2 | * | 6/2003 | Khedira et al. | 297/411.32 |
| 2003/0057759 A1 | * | 3/2003 | Kain | 297/411.32 |
| 2003/0155797 A1 | * | 8/2003 | Amirault et al. | 297/250.1 |

* cited by examiner

Primary Examiner—Peter R. Brown
(74) Attorney, Agent, or Firm—Barnes & Thornburg

(57) ABSTRACT

A juvenile vehicle seat assembly includes a seat having a side wall, an armrest mount coupled to the side wall of the seat, and an armrest coupled to the armrest mount for movement relative to the seat about a pivot axis between a raised position and a lowered position. The armrest mount includes an outer wall formed to define a first notch and a second notch spaced-apart from the first notch. The armrest includes an outer wall and a top wall coupled to the outer wall to cooperate with the outer wall to define a cavity formed to receive the outer wall of the armrest mount therein. A lug of the armrest is located within the first notch of the armrest mount in the raised position and is located within the second notch of the armrest mount in the lowered position.

21 Claims, 5 Drawing Sheets

JUVENILE SEAT WITH PIVOTABLE ARMREST

BACKGROUND

The present disclosure relates to a seat provided with an armrest, and particularly to an armrest included in a juvenile seat for use in a vehicle. More particularly, this disclosure relates to an armrest that is movable relative to a seat back in a juvenile seat.

Juvenile seats are used to seat and restrain children seated in vehicles. Many juvenile seats include seat bottoms and back and armrests. Such seats are adapted to use vehicle safety belts or other harnesses to restrain children seated on these seats.

SUMMARY

According to this disclosure, a juvenile vehicle seat assembly includes a juvenile vehicle seat and an armrest coupled to the seat. The armrest is mounted for movement relative to the seat about a pivot axis between a raised position and a lowered position. The armrest is also movable between a locked position where the armrest is prevented from pivoting about the pivot axis, and an unlocked position where the armrest is permitted to pivot about the pivot axis between the raised and lowered positions.

An armrest mount of the juvenile vehicle seat assembly is coupled to the seat and to the armrest. The armrest mount includes first and second notches for receiving a portion of the armrest therein when the armrest is in the locked position. The first notch receives a portion of the armrest when the armrest is in the raised, locked position, and the second notch receives a portion of the armrest when the armrest is in the lowered, locked position.

In illustrative embodiments, the armrest of the juvenile vehicle seat assembly includes a base having an outer wall and a top wall coupled to the outer wall to cooperate with the outer wall to define a cavity formed to receive the outer wall of the armrest mount therein. A lug coupled to the outer wall of the armrest provides the portion of the armrest received within one of the first and second notches of the armrest mount when the armrest is in the locked position.

The seat assembly further includes a biasing mechanism coupled to the armrest and the armrest mount. The biasing mechanism includes a compression spring which biases the armrest to the locked position in a direction toward a side wall of the seat.

The outer wall of the armrest mount includes outwardly extending perimeter teeth. Further, the outer wall of the base portion of the armrest includes inwardly extending perimeter teeth to mate with the outwardly extending teeth of the armrest mount. The armrest mount also includes one or more anti-rotation tabs to prevent rotation of the armrest relative to the armrest mount beyond the raised and lowered positions. Anti-rotation tabs are coupled to the outer wall of the armrest mount and extend beyond a top surface of the outer wall in a direction away from the side wall of the seat.

The armrest mount further includes a central hub positioned along the pivot axis and spaced-apart from the outer wall of the armrest mount. The central hub is received, at least in part, through an aperture of the base of the armrest. The compression spring of the biasing mechanism is positioned about the central hub of the armrest mount to engage the base of the armrest at a first end and to engage a top end of the central hub at a second end.

Features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
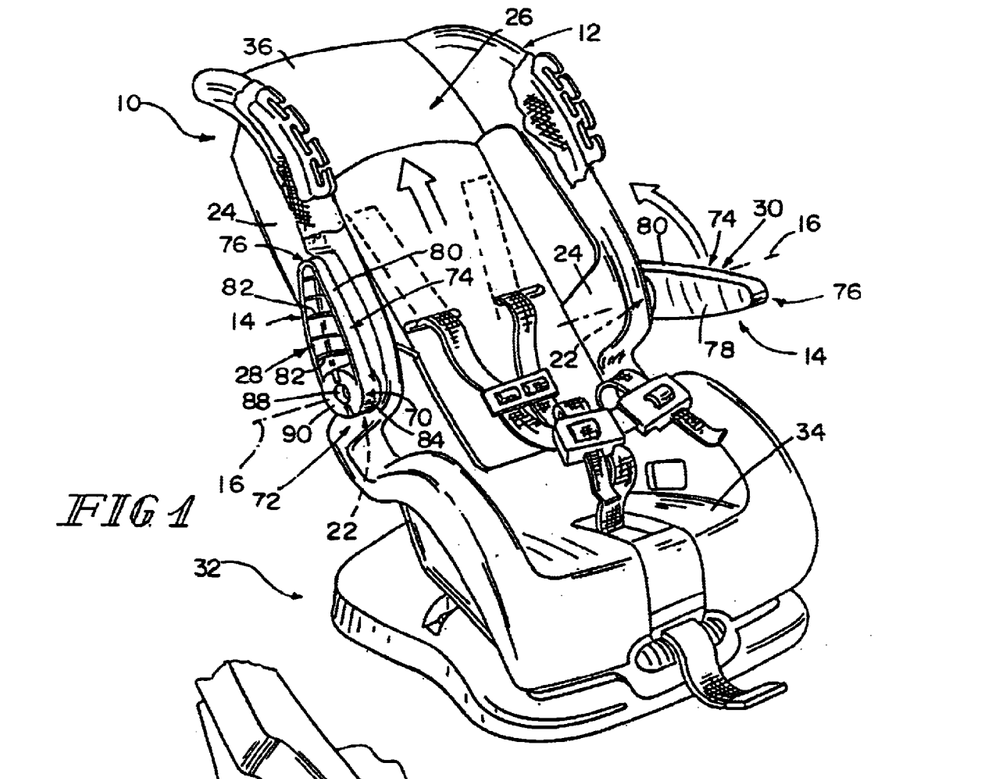
FIG. 1 is a perspective view of a juvenile vehicle seat including a pair of pivotable armrest assemblies showing a right-arm armrest of one assembly retained in a raised position and a left-arm armrest of another assembly retained in a lowered position.

A juvenile vehicle seat assembly 10 includes a juvenile vehicle seat 12 and a pair of movable armrest assemblies 14 mounted on seat 12 for pivotable movement about pivot axis 16 as shown, for example, in FIG. 1. Assemblies 14 include a right-arm armrest assembly 28 and a left-arm armrest assembly 30. Each assembly 28, 30 includes an armrest 18 and an armrest mount 22, as shown, for example, in FIG. 3. Each armrest mount 22 is provided on one of two side walls 24 of a seat back 26 of seat 12 as suggested in FIG. 1.

Each of the right-arm and left-arm armrests 18 is pivotable between a lowered, generally horizontal position, as shown by the left-arm armrest assembly 30 in FIG. 1, and a raised, generally vertical position, as shown by the right-arm armrest assembly 28 in FIG. 1. To move one of the armrests 18 between the raised and lowered positions, a user pulls armrest 18 in a generally linear direction 100 along pivot axis 16 away from seat 12 from a normally locked position, shown in FIG. 8, to an unlocked position, shown in FIG. 9. Once in the unlocked position, armrest 18 is pivotable about pivot axis 16, as shown by arrow 102, relative to seat 12 and armrest mount 22.

The armrests 18 of each of the right and left-arm armrest assemblies 28, 30 are movable independent from each other and are lockable in the raised or lowered positions. It is within the scope of this disclosure, however, to provide armrests movable between the raised and lowered positions which are lockable in one or more positions midway between the raised and lowered positions. Further, it is within the scope of this disclosure to provide armrests movable throughout a full 360 degrees of rotation about pivot axis 16.

Seat 12 of seat assembly 10 includes a base 32 adapted to set on a vehicle seat (not shown), a seat bottom 34 supported on base 32, and a seat back 26 arranged to extend upwardly from seat bottom 34 as shown, for example, in FIG. 1. Seat back 26 includes a seat back portion 36 and side wall 24 appended to each side of seat back portion 36. As mentioned above, one armrest mount 22 (shown in FIG. 3) is coupled to each side wall 24 of seat back 26.

Figure 3:
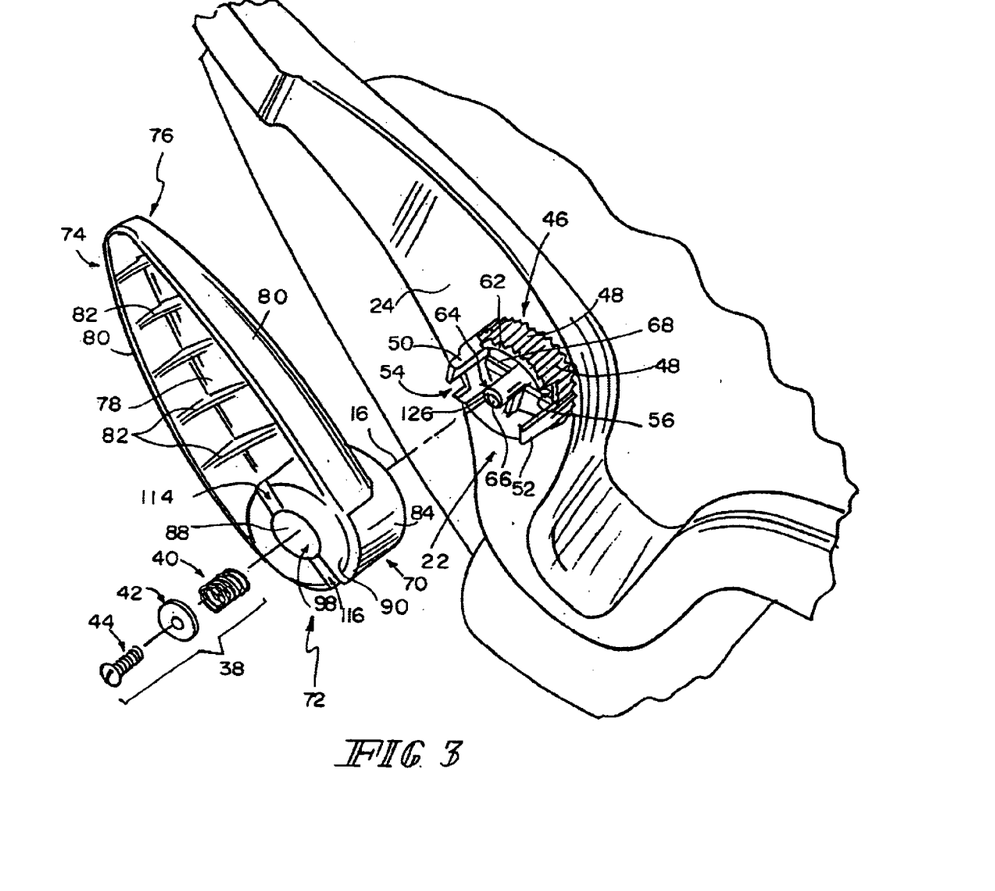
FIG. 3 is an exploded perspective view of the right-arm armrest assembly and a portion of the seat showing components of the armrest assembly. which components include an armrest mount provided on a side wall of the seat, the right-arm armrest that is adapted to fit onto the armrest mount and pivot relative to the armrest mount between the raised and lowered positions, and a biasing mechanism to normally retain the armrest in a locked position.

Looking now to FIG. 3, each armrest assembly 28, 30 includes mount 22 coupled to side wall 24, armrest 18 pivotably coupled to mount 22, and a biasing mechanism 38 for biasing each armrest 18 to the locked position. Each biasing mechanism includes a spring 40, a washer 42, and a screw 44. The following description and figures reference right-arm armrest assembly 28; however, it is noted that the components, function, and operation of each of the right and left-arm armrest assemblies 28, 30 are the same. Therefore, the detailed description and accompanying drawings are applicable to left-arm armrest assembly 30 as well.

Figure 4:
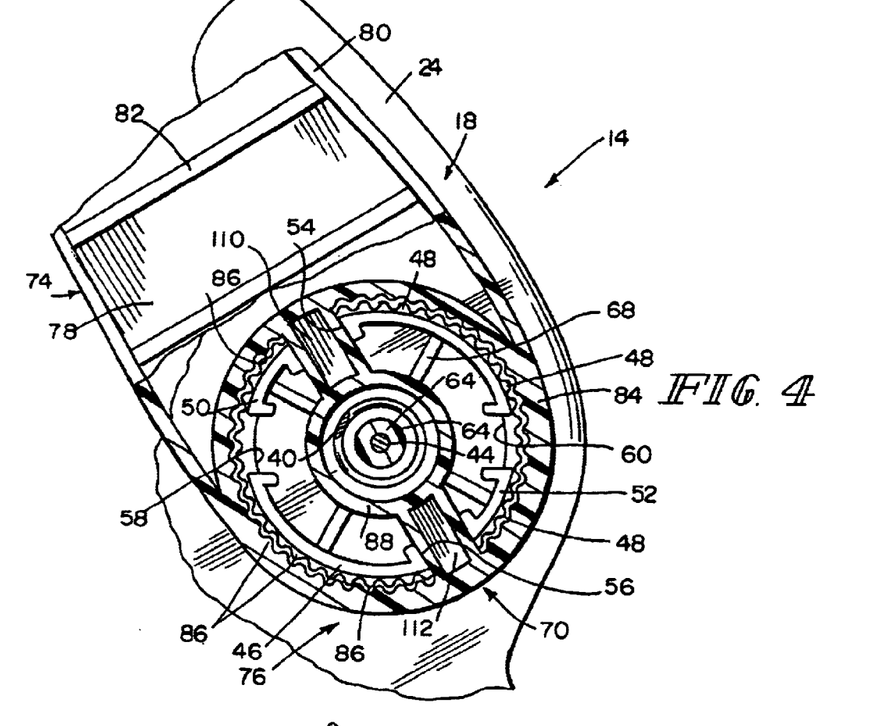
FIG. 4 is an enlarged side elevation view of a portion of the seat of FIG. 1, with portions broken away, showing the right-arm armrest mated with and locked to the armrest mount to retain the right-arm armrest in the raised position.
Figure 5:
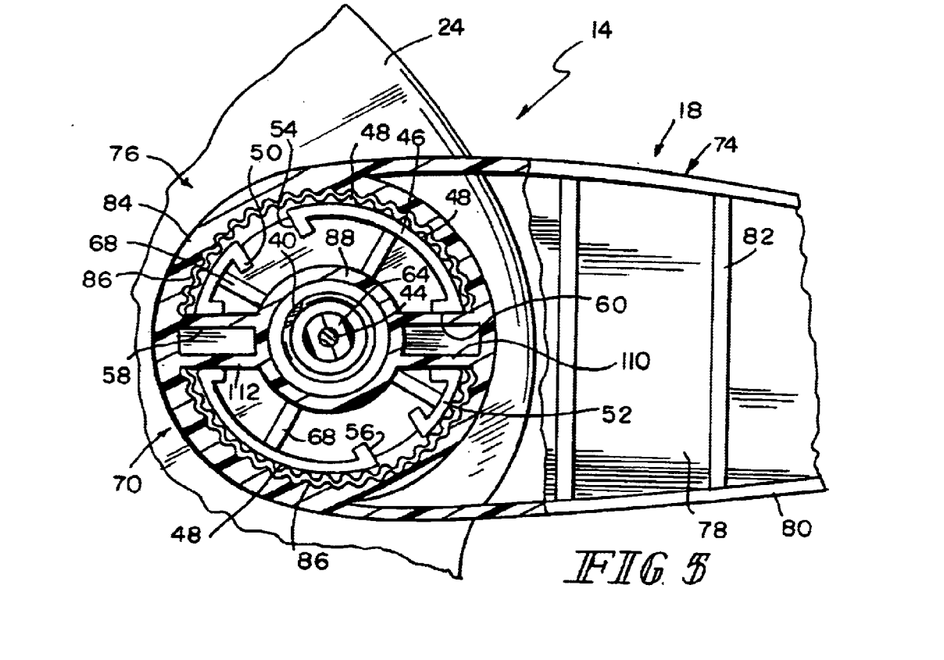
FIG. 5 is an enlarged side elevation view similar to FIG. 4 showing the right-arm armrest mated with and locked to the armrest mount to retain the right-arm armrest in the lowered position.

Mount 22 of right-arm armrest assembly 28 includes an outer perimetral ring 46 having radially outwardly extending perimeter teeth 48 and first and second rotation stoppers or anti-rotation tabs 50, 52 mounted to ring 46. As shown in FIG. 3, anti-rotation tabs 50, 52 extend outwardly away from side wall 24 beyond a top surface 62 of ring 46. A first pair of opposing notches 54, 56 and second pair of opposing notches 58, 60 are formed in ring 46, as shown best in FIGS. 4, 5, and 7, to provide mount 22 with first, second, third, and fourth notches 54, 60, 56, 58. First and third notches 54, 56 of the first pair of notches are positioned to lie approximately 180 degrees apart from each other about ring 46, while second and fourth notches 58, 60 of the second pair of notches also positioned to lie approximately 180 degrees apart from each other. As is discussed in greater detail below, first pair of opposed notches 54, 56 corresponds to the raised position, as shown in FIG. 4, while the second pair of opposed notches 58, 60 corresponds to the lowered position, as shown in FIG. 5.

Anti-rotation tab 50 of mount 22 is positioned between notch 54 of the first pair of notches and notch 58 of the second pair of notches. Anti-rotation tab 52, on the other hand, located across wall 46 from anti-rotation tab 50, is positioned between notch 56 of the first pair of notches and notch 60 of the second pair of notches. As mentioned above, each anti-rotation tab 50, 52 extends in a direction away from side wall 24 of seat back 26 beyond a top surface 62 of ring 46. As is discussed in greater detail below, anti-rotation tabs 50, 52 limit the pivoting movement of armrest 18 on mount 22 to movement between the raised and lowered positions.

Figures 6, 7:
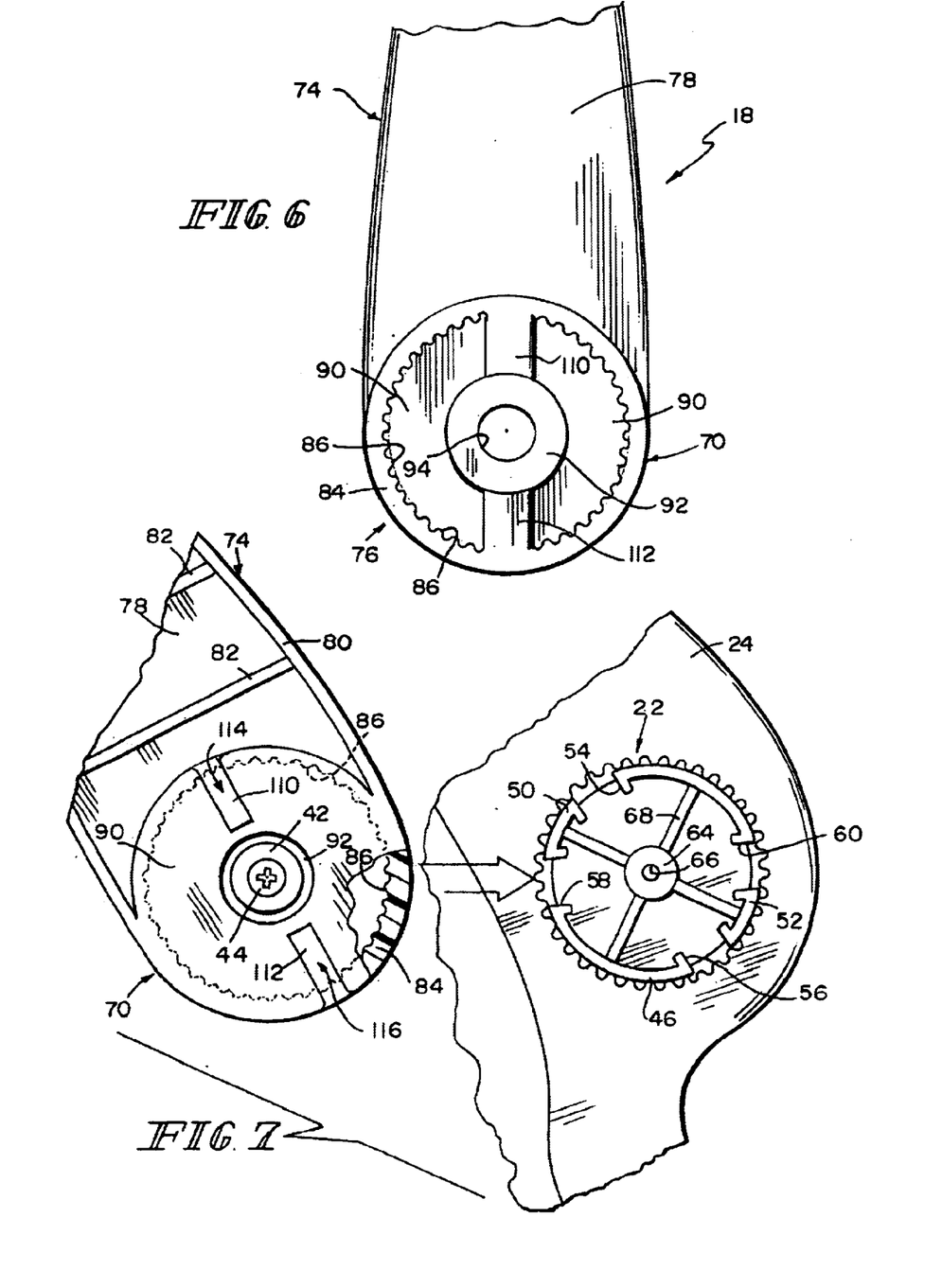
FIG. 6 is a side elevation view of an armrest of the right-arm armrest assembly showing a pair of retainer lugs spaced approximately 180 degrees apart from each other and arranged to be received within a portion of the armrest mount when the armrest is in the locked position.
FIG. 7 is a side elevation view showing an opposite, outer side of the armrest of FIG. 6, with portions broken away, and also showing the armrest mount of the assembly including a first and second pair of spaced-apart slots or notches for receiving the retainer lugs of the armrest in the raised and lowered positions, respectively.

First pair of notches 54, 56 receive a portion of armrest 18 when armrest 18 is in the raised and locked position with respect to mount 22 to prevent movement of armrest 18 relative to mount 22. Second pair of notches 58, 60 receive a portion of armrest 18 when armrest 18 is in the lowered and locked position. Outwardly extending perimeter teeth 48 of wall 46 provide support and rigidity to mount 22. It is also within the scope of this disclosure to provide armrest mounts without such perimeter teeth 48. Mount 22 further includes a central hub 64 having a threaded aperture 66 for receiving screw 44 of biasing mechanism 38 therein. As shown in FIGS. 4, 5, and 7, hub 64 is spaced-apart from ring 46 and is connected to ring 46 by flanges 68.

Figure 8:
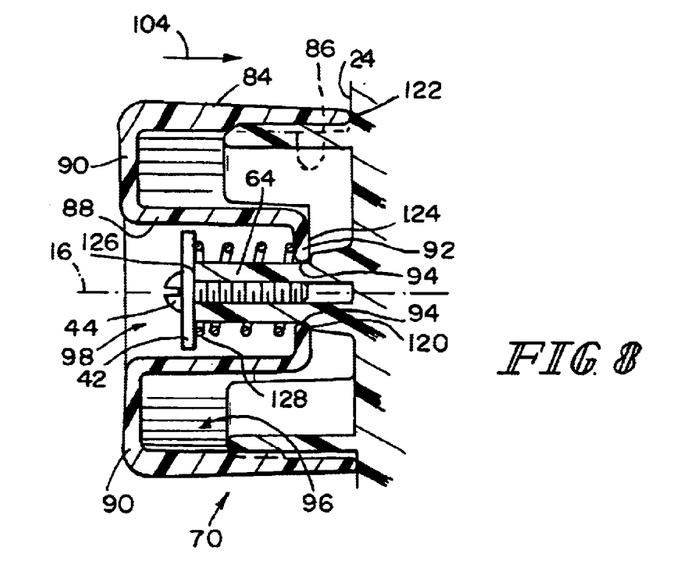
FIG. 8 is a sectional view taken along line 8—8 of FIG. 2 showing the biasing mechanism of the armrest assembly biasing the armrest to the locked position.
Figure 9:
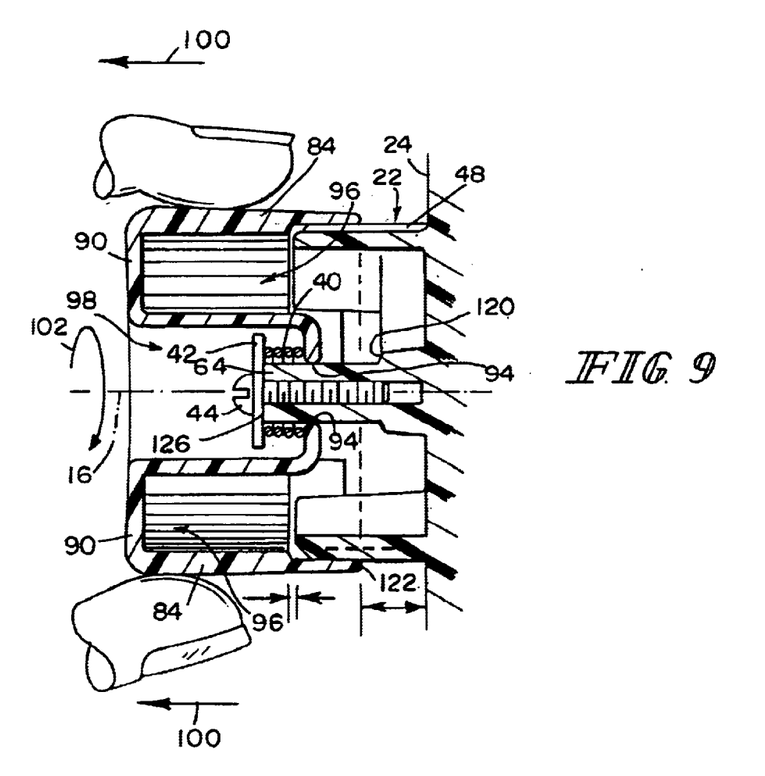
FIG. 9 is a sectional view similar to FIG. 8 showing movement of the armrest by a user in a direction away from the armrest mount against the bias of the biasing mechanism to an unlocked position to allow the armrest to pivot relative to the armrest mount between the raised and lowered positions.

Armrest 18 of each armrest assembly 28, 30 includes a base 70 positioned at an inner end 72 of armrest 18 and configured to mate with a respective mount 22, as shown in FIGS. 7–9, for example. Armrest 18 further includes arm 74 coupled to base 70 and arranged to define an outer end 76 of armrest 18. Illustratively, arm 74 includes an inner wall 78 with a curved side wall or rim 80 appended thereto. Arm 74 further includes reinforcing supports 82 and each support 82 is coupled to inner wall 78 and rim 80.

Base 70 of armrest 18 includes an outer wall 84 having inwardly extending perimeter teeth 86 provided to mate with outwardly extending perimeter teeth 48 of mount 22. Base 70 further includes an inner or interior wall 88, shown best in FIGS. 8 and 9, which is concentric with outer wall 84, a top wall 90 coupled to and arranged to extend between inner and outer walls 88, 84, and a bottom wall 92 coupled to inner wall 84 and formed to define an aperture 94 therein to receive at least a portion of central hub 64 of mount 22 therethrough. Outer wall 84, inner wall 88, and top wall 90 cooperate to define a cavity 96 sized to receive at least a portion of outer ring 46 of mount therein. Inner wall 88 and bottom wall 92 cooperate to define a recessed area 98 for receiving biasing mechanism 38 (including spring 40, washer 42, and screw 44).

Base 70 further includes first and second retainer lugs 110, 112 coupled to and arranged to extend between inner wall 88 and outer wall 84, as shown in FIGS. 4, 5, and 6. Illustrative retainer lugs 110, 112 are positioned to lie approximately 180 degrees apart from one another and are formed to be received within first pair of notches 54, 56 when armrest 18 is in the raised, locked position and second pair of notches 58, 60 when armrest 18 is in the lowered, locked position. Particularly, lug 110 is received within notch 54 and lug 112 is received within notch 56 when armrest 18 is in the raised, locked position, as shown in FIG. 4. Similarly, lug 110 is received within notch 60 and lug 112 is received within notch 58 when armrest 18 is in the lowered, locked position, as shown in FIG. 5. Although each armrest assembly 28, 30 of the present disclosure includes armrest 18 having retainer lugs 110, 112, and mount 22 including notches 54, 56, 58, 60, it is also within the scope of this disclosure to provide an armrest assembly including an armrest mount having lugs and an armrest base having notches for receiving the lugs therein to pivotably lock the armrest to the armrest mount.

Figure 2:
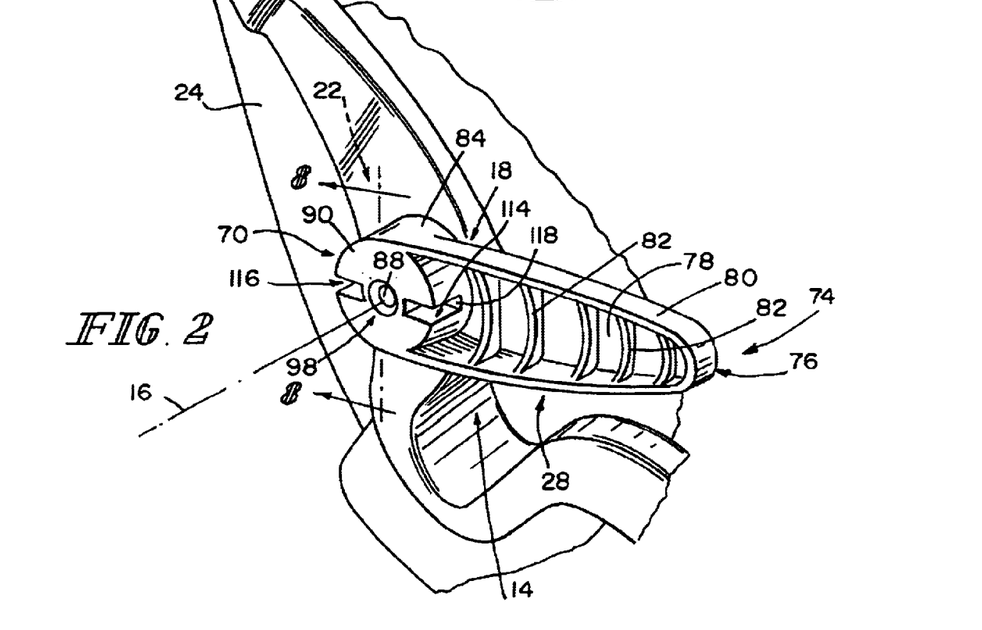
FIG. 2 is an enlarged perspective view of a portion of the seat of FIG. 1 showing the right-arm armrest after it has been moved to the lowered position.

Looking now to FIG. 2, base 70 includes two notches 114, 116 formed in top wall 90 and outer wall 84 to reveal a top or outer surface 118 of each respective retainer lug 110, 112. Notches 114, 116 enable a user to see the position of the retainer lugs 110, 112 as armrest 18 is pivoted about axis 16 between the raised and lowered positions. Notches 114, 116 thus act as position locators for armrest 18.

As mentioned above, armrest 18 is movable generally linearly in directions 100, 104 (shown in FIGS. 8 and 9) between locked and unlocked positions and is pivotable clockwise and counterclockwise in direction 102 (shown in FIG. 9) about axis 16 between the raised position and the lowered position. Armrests 18 (of right-arm armrest assembly 28 and left-arm armrest assembly 30) move independent of each other between these two positions. As mentioned above, it is within the scope of this disclosure to provide an armrest which may be locked in any position between the raised and lowered positions disclosed. Further, it is within the scope of this disclosure to provide an armrest pivotable about an axis and lockable between positions other than the illustrative raised and lowered positions. For example, each armrest may pivot about axis 16 a full 360 degrees and may be locked in any position about the 360 degrees.

When armrest assembly 28 is assembled, base 70 of armrest 18 receives mount 22 so that inwardly extending perimeter teeth 86 of outer wall 84 of base 70 mate with outwardly extending perimeter teeth 48 of ring 46 of mount 22. Ring 46 and first and second anti-rotation tabs 50, 52 of mount 22 are received within cavity 96 of base 70, as shown in FIG. 8. Aperture 94 of bottom wall 92 of base 70 receives central hub 64 of mount 22 therethrough so that bottom wall 92 of base 70 engages a rim 120 of hub 64. Further, an end 122 of outer wall 84 of base 70 engages side wall 24 of seat 12, as shown in the locked position in FIG. 8. Central hub 64 thus is positioned within recessed area 98 of base 70.

Armrest 18 is secured to mount 22 by biasing mechanism 38. Compression spring 40 is positioned around central hub 64 so that a first end 124 of spring 40 engages bottom wall 92 of base 70. Washer 42 is positioned to lie adjacent a top surface 126 of hub 64 and a second end 128 of spring 40. Screw 44 is received within threaded aperture 94 of hub 64 to secure armrest 18 to mount 22.

Spring 40 acts against a top surface of bottom wall 92 of base 70 and washer 42 to bias armrest 18 normally to the locked position in a direction 104 toward side wall 24 of seat 12. A user moves armrest 18 to the unlocked position by grasping outer wall 84 of base 70, as shown in FIG. 9, and pulling armrest 18 in a generally linear direction 100 away from side wall 24 of seat 12 against the bias of spring 40. As armrest 18 moves away from mount 22 and side wall 24, lugs 110, 112 are removed from within either the first pair of notches 54, 56 (when in the raised position) or the second pair of notches 58, 60 (when in the lowered position). Once lugs 110, 112 are removed from notches 54, 56 or 58, 60, armrest 18 is in the unlocked position and is free to rotate about axis 16.

Anti-rotation tabs 50, 52 act as rotation stoppers to limit the rotation of armrest 18 to pivotable movement between the raised and lowered positions. For example, when armrest base 70 is unlocked and rotated in a counterclockwise direction toward the raised position, lug 110 will engage tab 50 and lug 112 will engage tab 52, as shown in FIG. 4, once armrest 18 is actually in the raised position so that lug 110 is aligned with notch 54 and lug 112 is aligned with notch 56. Once the counterclockwise rotation is stopped by tabs 50, 52, lugs 110, 112 are aligned with respective notches 54, 56, and the user may release base 70 to allow spring 40 to bias armrest 18 in a direction toward seat 12 and mount 22 to the locked position where lugs 110, 112 are received within notches 54, 56 respectively.

Similarly, when base 70 is in the unlocked position and is rotated in a clockwise direction toward the lowered position, as shown in FIG. 5, lug 110 will engage tab 52 and lug 112 will engage tab 50. Thus, tabs 50, 52 function to prevent further clockwise rotation and signal to the user that lugs 110, 112 are aligned with respective notches 60, 58. As mentioned above, the indicator notches 114, 116 of base 70, as shown in FIGS. 3 and 7, also indicate to the user the position of the lugs 110, 112 relative to seat 12 and mount 22 so that user may properly align the lugs 110, 112 with notches 54, 56 or with notches 58, 60. The user may then release base 70 to allow spring 40 to bias armrest 18 in direction 104 toward seat 12 and mount 22 to the locked position wherein lugs 110, 112 are received within notches 60, 58, respectively.

What is claimed is:

1. A juvenile vehicle seat assembly comprising
a juvenile vehicle seat including a side wall,
an armrest mount coupled to the side wall of the seat and including a cylindrical, outer wall formed to extend in a direction away from the side wall of the seat, the outer wall being formed to define a first notch and a second notch spaced-apart from the first notch,
an armrest coupled to the armrest mount for movement relative to the seat about a pivot axis between a raised position and a lowered position, the armrest including a base having an outer wall with inwardly extending perimeter teeth and a top wall coupled to the outer wall to cooperate with the outer wall to define a cavity formed to receive the outer wall of the armrest mount therein, and a lug coupled to the outer wall of the armrest, the lug being located within the first notch of the armrest mount in the raised position and within the second notch of the armrest mount in the lowered position, and
wherein the armrest mount includes perimeter teeth extending from the cylindrical outer wall of the armrest mount away from the pivot axis for engagement with the inwardly extending perimeter teeth of the armrest.

2. The juvenile vehicle seat assembly of claim 1, wherein the armrest is movable between a locked position where the lug of the armrest is received within the one of the first and second notches of the armrest mount, and an unlocked position where the lug of the armrest is spaced-apart from either of the first and second notches of the armrest mount, and further comprising a compression spring engaged with the armrest and the armrest mount to bias the armrest normally to the locked position.

3. The juvenile vehicle seat assembly of claim 2, wherein the armrest mount includes a central hub positioned along the pivot axis and the compression spring is positioned around the central hub to biased the armrest in a direction toward the seat.

4. The juvenile vehicle seat assembly of claim 1, wherein the lug of the armrest is a first lug and the armrest further comprises a second lug spaced-apart from the first lug, the armrest mount further includes a third notch spaced-apart from the first and second notches and a fourth notch spaced-apart from the first, second, and third notches, the first lug is located within the first notch and the second lug is located within the third notch when the armrest is in the raised position, and the first lug is located within the second notch and the second lug is located within the fourth notch when the armrest is in the lowered position.

5. The juvenile vehicle seat assembly of claim 4, wherein the first lug of the armrest is positioned to lie about 180 degrees apart from the second lug of the armrest, the first notch of the armrest mount is positioned to lie about 180 degrees apart from the third notch of the armrest mount, and the second notch of the armrest mount is positioned to lie about 180 degrees apart from the fourth notch of the armrest mount.

6. The juvenile vehicle seat assembly of claim 1, further comprising a spring arranged to bias the armrest to a locked position upon movement of the armrest about the pivot axis to one of the raised position and the lowered position.

7. A juvenile vehicle seat assembly comprising a juvenile vehicle seat including a side wall, an armrest mount coupled to the side wall of the seat and including a cylindrical, outer wall formed to extend in a direction away from the side wall of the seat, the outer wall being formed to define a first notch and a second notch spaced-apart from the first notch, and an armrest coupled to the armrest mount for movement relative to the seat about a pivot axis between a raised position and a lowered position, the armrest including a base having an outer wall and a top wall coupled to the outer wall to cooperate with the outer wall to define a cavity formed to receive the outer wall of the armrest mount therein, and a lug coupled to the outer wall of the armrest, the lug being located within the first notch of the armrest mount in the raised position and within the second notch of the armrest mount in the lowered position, wherein the armrest mount further includes a first anti-rotation tab coupled to the outer wall and formed to extend away from a top surface of the outer wall in a direction away from the side wall of the seat, and a second anti-rotation tab coupled to the outer wall, spaced-apart about 180 degrees from the first anti-rotation tab, and formed to extend away from the top surface of the outer wall in a direction away from the side wall of the seat, and wherein the first anti-rotation-tab is engaged with the lug of the armrest in the raised position and the second anti-rotation tab is engaged with the lug of the armrest in the lowered position.

8. The juvenile vehicle seat assembly of claim 7, wherein the outer wall of the armrest mount includes outwardly extending perimeter teeth, and wherein the outer wall of the armrest base includes inwardly extending perimeter teeth to mate with the outwardly extending perimeter teeth of the armrest mount.

9. A juvenile vehicle seat assembly comprising a juvenile vehicle seat including a side wall, an armrest mount coupled to the side wall of the seat and including a cylindrical, outer wall formed to extend in a direction away from the side wall of the seat, the outer wall being formed to define a first notch and a second notch spaced-apart from the first notch, and an armrest coupled to the armrest mount for movement relative to the seat about a pivot axis between a raised position and a lowered position, the armrest including a base having an outer wall and a top wall coupled to the outer wall to cooperate with the outer wall to define a cavity formed to receive the outer wall of the armrest mount therein, and a lug coupled to the outer wall of the armrest, the lug being located within the first notch of the armrest mount in the raised position and within the second notch of the armrest mount in the lowered position, wherein the armrest is movable between a locked position where the lug of the armrest is received within the one of the first and second notches of the armrest mount, and an unlocked position where the lug of the armrest is spaced-apart from either of the first and second notches of the armrest mount, and further comprising a compression spring engaged with the armrest and the armrest mount to bias the armrest normally to the locked position, and wherein the armrest mount includes a central hub spaced-apart from and concentric with the outer wall of the armrest mount, the base of the armrest includes an inner wall coupled to the top wall and spaced-apart from the outer wall and a bottom wall coupled to the inner wall and formed to include an aperture to receive the central hub of the armrest mount therethrough, and the compression spring is positioned around the central hub and comprises a first end engaged with the bottom wall of the base of the armrest and a second end rigidly coupled to an outer end of the central hub.

10. A juvenile vehicle seat assembly comprising a juvenile vehicle seat including a side wall, an armrest mount coupled to the side wall of the seat and including a cylindrical, outer wall formed to extend in a direction away from the side wall of the seat, the outer wall being formed to define a first notch and a second notch spaced-apart from the first notch, and an armrest coupled to the armrest mount for movement relative to the seat about a pivot axis between a raised position and a lowered position, the armrest including a base having an outer wall and a top wall coupled to the outer wall to cooperate with the outer wall to define a cavity formed to receive the outer wall of the armrest mount therein, and a lug coupled to the outer wall of the armrest, the lug being located within the first notch of the armrest mount in the raised position and within the second notch of the armrest mount in the lowered position, wherein the lug of the armrest is a first lug and the armrest further comprises a second lug spaced-apart from the first lug, the armrest mount further includes a third notch spaced-apart from the first and second notches and a fourth notch spaced-apart from the first, second, and third notches, the first lug is located within the first notch and the second lug is located within the third notch when the armrest is in the raised position, and the first lug is located within the second notch and the second lug is located within the fourth notch when the armrest is in the lowered position, and wherein armrest mount further includes first and second anti-rotation tabs coupled to the outer wall of the armrest mount and arranged to extend away from a top surface of the outer wall in a direction away from the side wall of the seat, the first anti-rotation tab is positioned between the first and second notches of the armrest mount, and the second anti-rotation tab is positioned between the third and fourth notches of the armrest mount.

11. The juvenile vehicle seat assembly of claim 10, wherein the first lug engages the first anti-rotation tab and the second lug engages the second anti-rotation tab when the armrest is in the raised position and wherein the first lug engages the second anti-rotation tab and the second lug engages the first anti-rotation tab when the armrest is in the lowered position.

12. A juvenile vehicle seat assembly comprising a juvenile vehicle seat including a side wall, an armrest mount coupled to the side wall of the seat and including a cylindrical, outer wall formed to extend in a direction away from the side wall of the seat, the outer wall being formed to define a first notch and a second notch spaced-apart from the first notch, and an armrest coupled to the armrest mount for movement relative to the seat about a pivot axis between a raised position and a lowered position, the armrest including a base having an outer wall and a top wall coupled to the outer wall to cooperate with the outer wall to define a cavity formed to receive the outer wall of the armrest mount therein, and a lug coupled to the outer wall of the armrest, the lug being located within the first notch of the armrest mount in the raised position and within the second notch of the armrest mount in the lowered position, further comprising a spring arranged to bias the armrest to a locked position upon movement of the armrest about the pivot axis to one of the raised position and the lowered position, and wherein the armrest mount further includes a central hub positioned to lie along the pivot axis and received within an aperture of the armrest, and the spring is positioned about the central hub of the armrest mount and is coupled to the central hub at a first end of the spring and is engaged with a portion of the armrest at a second end of the spring normally to bias the armrest in a direction toward the armrest mount.

13. The juvenile vehicle seat assembly of claim 12, wherein the armrest further includes an inner wall coupled to the top wall and a bottom wall coupled to the inner wall, the bottom wall is formed to define an aperture to receive at least a portion of the central hub of the armrest mount therethrough, and the second end of the spring engages the bottom wall of the armrest to bias the armrest in a direction toward the seat.

14. The juvenile vehicle seat assembly of claim 13, wherein the top, inner, and bottom walls of the armrest cooperate to define a cavity formed to receive the compression spring and at least a portion of the central hub therein.

15. The juvenile vehicle seat assembly of claim 13, wherein the lug of the armrest is a first lug, the armrest includes a second lug spaced about 180 degrees apart from the first lug, and the first and second lugs are each coupled to and positioned to extend between the outer and inner walls of the armrest.

16. A juvenile vehicle seat assembly comprising a seat including a seat back and a side wall coupled to the seat back, an armrest mounted to the side wall of the seat for rotational movement relative to the seat about a pivot axis between a raised position and a lowered position, the armrest also being mounted for linear movement relative to the seat along the pivot axis between a locked position and an unlocked position, the armrest including an arm portion and a base portion coupled to the arm portion and mounted to the side wall of the seat, and an armrest mount coupled to the side wall of the seat and coupled to the armrest, the armrest mount including an outer circular wall coupled to the side wall of the seat and positioned to extend in a direction away from the side wall of the seat and a central hub concentric with the outer wall and positioned to lie along the pivot axis and to extend in a direction away from the side wall of the seat, wherein the outer wall of the armrest mount includes a first pair of notches to receive a first lug of the armrest therein when the armrest is in the raised, locked position, and a second pair of notches to receive a second lug of the armrest therein when the armrest is in the lowered, locked position, wherein the base portion of the armrest includes an outer, cylindrical wall, a top wall coupled to the outer wall, and an interior wall coupled to the top wall and concentric with the outer wall, the outer, top, and interior walls cooperate to define a cavity formed to receive the outer wall of the armrest mount therein, the base portion further comprising the first and second lugs, each of the first and second lugs is coupled to and positioned to extend between the outer wall and the interior wall of the base portion, and wherein the central hub of the armrest mount is normally received within an aperture of the base portion of the armrest formed in a bottom wall of the base portion coupled to the interior wall.

17. The juvenile vehicle assembly of claim 16, further comprising a compression spring positioned about the central hub of the armrest, and wherein a first end of the compressing spring engages the bottom wall of the base portion of the armrest and a second end of the compression spring is coupled to an outer end of the central hub of the armrest mount.

18. The juvenile vehicle assembly of claim 17, wherein the compression spring normally biases the armrest in a direction toward the seat.

19. The juvenile vehicle assembly of claim 17, wherein the top wall, inner wall, and bottom wall of the base portion of the armrest cooperate to define a cavity formed to receive the compression spring and at least a portion of the central hub of the armrest mount therein.

20. The juvenile vehicle assembly of claim 16, wherein the outer wall of the armrest mount includes outwardly extending perimeter teeth, and the outer wall of the armrest base includes inwardly extending perimeter teeth to mate with the outwardly extending perimeter teeth of the armrest mount.

21. A juvenile vehicle seat assembly comprising a seat, an armrest mount coupled to the seat, an armrest coupled to the armrest mount for rotation on the armrest mount about a pivot axis between a raised position and a lowered position, the armrest being mounted for linear movement along the pivot axis between a locked position and an unlocked position, and a biasing mechanism coupled to the armrest mount and the armrest to bias the armrest to the locked position in a direction toward the seat, wherein the armrest mount includes a central hub positioned along the pivot axis and a cylindrical outer wall spaced-apart from the central hub, the outer wall is formed to extend in a direction away from the seat and to include perimeter teeth extending from the outer wall cylindrical surface away from the pivot axis, and wherein the armrest includes an arm portion and a base portion coupled to the arm portion and coupled to the armrest mount, the base portion includes an outer wall having inwardly extending perimeter teeth mating with the outwardly extending perimeter teeth of the armrest mount, and the armrest further includes an aperture receiving at least a portion of the central hub of the armrest mount therethough.

* * * * *